(12) United States Patent
Liu et al.

(10) Patent No.: US 8,478,024 B2
(45) Date of Patent: Jul. 2, 2013

(54) DEPTH MAP GENERATION MODULE FOR FOREGROUND OBJECT AND METHOD THEREOF

(75) Inventors: Kai Che Liu, Kaohsiung (TW); Wei Jia Huang, Nantou County (TW); Chun Te Wu, Taoyuan County (TW); Chin Yuan Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 92 days.

(21) Appl. No.: 13/286,501

(22) Filed: Nov. 1, 2011

(65) Prior Publication Data

US 2012/0170832 A1 Jul. 5, 2012

(30) Foreign Application Priority Data

Dec. 31, 2010 (TW) ................................. 99147152 A
Jul. 11, 2011 (TW) ............................... 100124396 A

(51) Int. Cl.
*G06K 9/00* (2006.01)

(52) U.S. Cl.
USPC ........................................................ 382/154

(58) Field of Classification Search
USPC ................. 382/103, 107, 232, 236, 238, 239, 382/154; 348/51; 375/240.03, 240.12
See application file for complete search history.

(56) References Cited

U.S. PATENT DOCUMENTS

| | | | |
|---|---|---|---|
| 5,845,006 A | 12/1998 | Sumi et al. | |
| 6,873,654 B1 * | 3/2005 | Rackett | 375/240.03 |
| 7,120,277 B2 | 10/2006 | Pelagotti et al. | |
| 7,359,440 B2 * | 4/2008 | Zhang et al. | 375/240.16 |
| 7,502,522 B2 | 3/2009 | Soupliotis et al. | |
| 7,715,589 B2 | 5/2010 | Freeman et al. | |
| 2006/0067585 A1 * | 3/2006 | Pace | 382/243 |
| 2008/0263605 A1 * | 10/2008 | Mine et al. | 725/87 |
| 2009/0116732 A1 | 5/2009 | Zhou et al. | |
| 2010/0026784 A1 | 2/2010 | Burazerovic | |
| 2010/0111417 A1 | 5/2010 | Ward et al. | |

OTHER PUBLICATIONS

Chenglei Wu, Guihua Er, Xudong Xie, Tao Li, Xun Cao, and Qionghai Dai, "A Novel Method for Semi-automatic 2D to 3D Video Conversion" 3DTV Conference: The True Vision-Capture, Transmission and Display of 3D Video 2008, pp. 65-68, May 2008.

Xue Bai, Jue Wang, David Simons, and Guillermo Sapiro, "Video SnapCut: Robust Video Object Cutout Using Localized Classifiers", ACM Transactions on Graphics (Proc. SIGGRAPH) 2009 Papers, pp. 1-11, 2009.

Zheng Li, Xudong Xie, and Xiaodong Liu, "An Efficient 2D to 3D Video Conversion Method Based on Skeleton Line Tracking", 3DTV Conference: The True Vision—Capture, Transmission and Display of 3D Video, 2009 pp. 1-4, May 2009.

* cited by examiner

*Primary Examiner* — Matthew Bella
*Assistant Examiner* — Elisa Rice
(74) *Attorney, Agent, or Firm* — WPAT, P.C.; Anthony King

(57) ABSTRACT

The present invention discloses a depth map generation module for a foreground object and the method thereof. The depth map generation method for a foreground object comprises the following steps: receiving an image sequence data, wherein the image sequence data includes a plurality of image frames; selecting at least one key image frame from the image sequence data; providing at least one depth indicative information and a contour of a first segment in the at least one key image frame; and performing a signal processing steps by a microprocessor.

24 Claims, 10 Drawing Sheets

DEPTH MAP GENERATION MODULE FOR FOREGROUND OBJECT AND METHOD THEREOF

BACKGROUND OF THE INVENTION

1. Technical Field

The present invention relates to a depth map generation module for a foreground object and the method thereof applied in two dimensional (2D) image sequence data, so as to provide 3D image data.

2. Background

As the quality of life improves with technological advancements, display technology continues to move forward. In order to meet the demands for more realistic images, display technology has moved from 2D to 3D. In addition to ordinary image and color, 3D image can further provide a 3D visual experience.

One method for generating 3D images involves adding extra depth information. By adding depth maps corresponding to 2D images to the original 2D image, one can obtain a 3D image from at least two different perspectives against the left or right eye through a simulation, or through a 3D image display supporting multi-perspective imaging.

3D image displays have gradually emerged in the market. However, the lack of 3D image data supplying 3D image displays limits the application field and the promotion of the 3D image displays. Because the current mainstream image content is still mainly 2D, there is a need to develop a depth map generation module and the method thereof and apply it to the 2D image sequence data, so as to provide 3D image data.

SUMMARY

One embodiment of the depth map generation module for a foreground object of the present invention comprises a microprocessor and a storage unit. The storage unit is coupled with the microprocessor, and is configured to store data processed by the microprocessor. The microprocessor comprises a sequence unit, a data providing unit, a contour generation unit, a segment motion vector generation unit, and a depth motion unit. The sequence unit is configured to receive the image sequence data, and to selectively adjust the order of image sequence data according to the operation mode of the depth map generation unit for a foreground object, so as to generate transformed image sequence data. The transformed image sequence data comprises at least one key image frame and a first non-key image frame. The data providing unit is configured to provide at least one first depth indicative information and a contour of a first segment in the at least one key image frame. The segment motion vector generation unit is configured to generate a segment motion vector, a deformed key image frame, and a deformed contour in the first segment according to color information of the key image frame, the color information of the first non-key image frame, and a contour of a first segment in the key image frame. The contour generation unit is configured to generate a contour of a second segment in the first non-key image frame according to the segment motion vector, the contour of the first segment, color information of the deformed key image frame, the contour of the deformed first segment, color information of the key image frame, and color information of the first non-key image frame, wherein the first and the second segments correspond to the same object in the key image frame. The depth motion unit is configured to transfer at least one first depth indicative information of the at least one key image frame to the first non-key image frame according to the segment motion vector, so as to generate at least one second depth indicative information in the first non-key image frame.

The depth map generation method for a foreground object comprises the following steps: receiving an image sequence data, wherein the image sequence data comprises a plurality of image frames, and each image frame comprises at least one object; selecting at least one key image frame from the image sequence data; providing at least one first depth indicative information and a contour of a first segment in the at least one key image frame; and performing signal processing steps by a microprocessor. The signal processing steps comprise: generating a segment motion vector, a deformed key image frame, and a contour of the deformed first segment according to color information of the key image frame, color information of the first non-key image frame, and a contour of the first segment in the key image frame; generating a contour of a second segment in the first non-key image frame according to the segment motion vector, the contour of the first segment, the color information of the deformed key image frame, the contour of the deformed first segment, the color information of the key image frame, and the color information of the first non-key image frame, wherein the first and second segments correspond to the same object in the key image frame; and transferring at least one first depth indicative information in the at least one key image frame to the first non-key image frame according to the segment motion vector so as to generate at least one second depth indicative information in the first non-key image frame.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

The embodiments of the present invention will be described in detail with reference to the drawings in the following description. Throughout the description, identical or similar devices are labeled with similar reference numbers.

Figure 1:
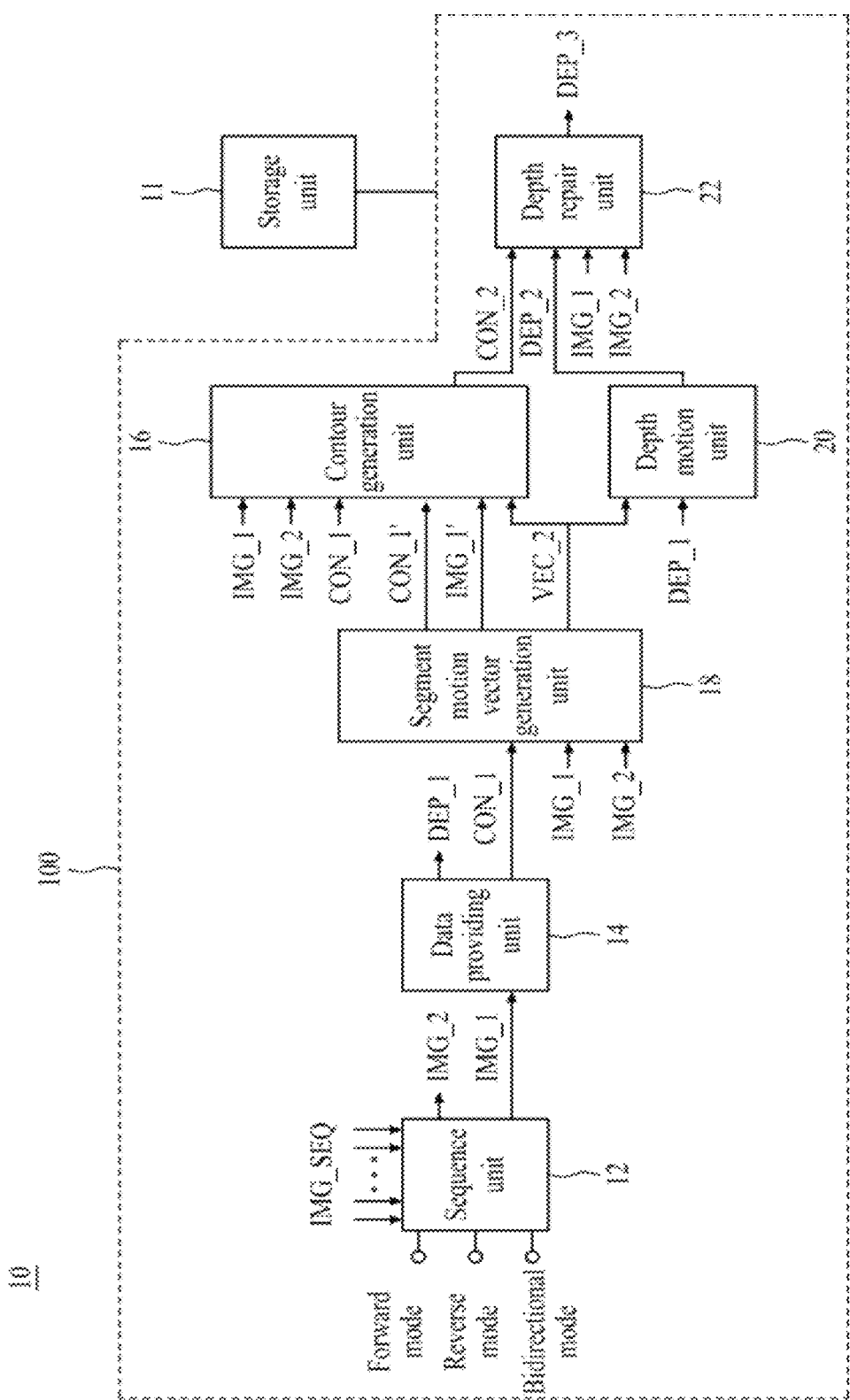
FIG. 1 shows a block diagram of a depth map generation module for a foreground object according to an embodiment of the present invention.

In order to explain the generation method of the depth map in the present invention, the following will describe the depth map generation module used as a means of executing the method of the present invention. FIG. 1 shows a block diagram of a depth map generation module for a foreground object 10 according to an embodiment of the present invention. The depth map generation module for a foreground object 10 is configured to receive 2D image sequence data IMG_SEQ, wherein the IMG_SEQ comprises a plurality of image frames. Referring to FIG. 1, the depth map generation module for a foreground object 10 comprises a microprocessor 100 and a storage unit 11. The storage unit 11 is coupled with the microprocessor 100, and is configured to store the data processed by the microprocessor 100. The microprocessor 100 comprises a sequence unit 12, a data providing unit 14, a contour generation unit 16, a segment motion vector generation unit 18, a depth motion unit 20, and a depth repair unit 22. The depth map generation module for a foreground object 10 can selectively operate under three operation modes: forward operation mode, reverse operation mode, and bidirectional operation mode. According to different operation modes, the depth map generation module for a foreground object 10 can automatically generate a depth map of the image sequence data IMG_SEQ, so as to transform the 2D image sequence data IMG_SEQ into a format that can be viewed as a 3D image through a 3D display by viewers.

Figure 2:
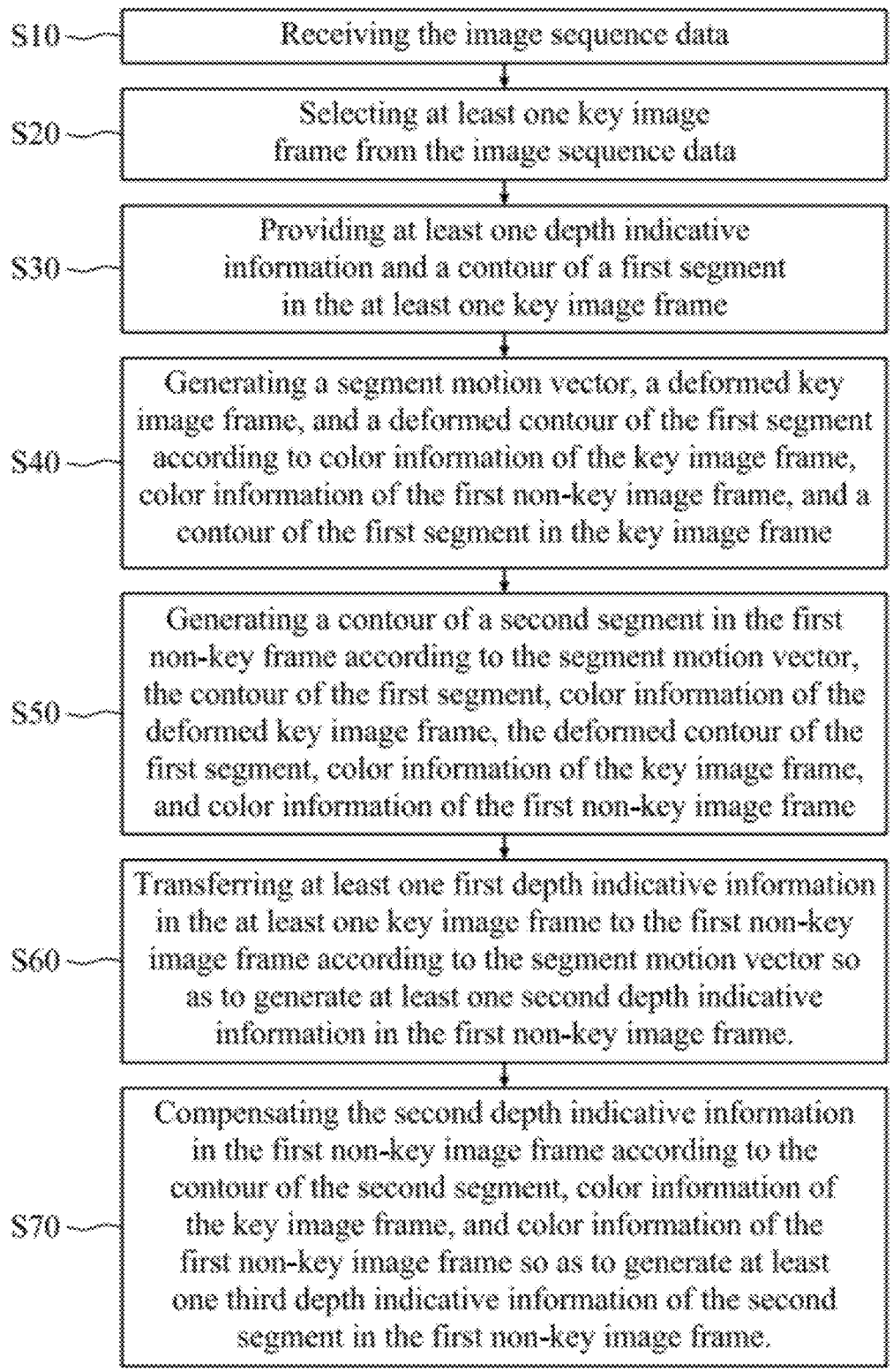
FIG. 2 is a flow chart of a method for generation of a depth map for a foreground object according to an embodiment of the present invention.

FIG. 2 is a flow chart of a depth map generation method for a foreground object according to an embodiment of the present invention, wherein the sequence data corresponds to the same scene. The method comprises: receiving the image sequence data (step S10), wherein the image sequence data comprises a plurality of image frames, and each image frame comprises at least one object; selecting at least one key image frame from the image sequence data (step S20); providing at least one depth indicative information and a contour of a first segment in the at least one key image frame (step S30); generating a segment motion vector, a deformed key image frame, and a contour of the deformed first segment according to color information of the key image frame, color information of the first non-key image frame, and a contour of the first segment in the key image frame (step S40); generating a contour of a second segment in the first non-key image frame according to the segment motion vector, the contour of the first segment, color information of the deformed key image frame, the contour of the deformed first segment, color information of the key image frame, and color information of the first non-key image frame (step S50), wherein the first and second segments correspond to the same object in the key image frame; transferring at least one first depth indicative information in the at least one key image frame to the first non-key image frame according to the segment motion vector so as to generate at least one second depth indicative information in the first non-key image frame (step S60); and compensating the second depth indicative information in the first non-key image frame according to the contour of the second segment, color information of the key image frame, and color information of the first non-key image frame so as to generate at least one third depth indicative information of the second segment in the first non-key image frame (step S70), wherein steps S40 to S70 are executed through a microprocessor. The following describes the details of the depth map generation method as shown in FIG. 1.

Referring to FIGS. 1 and 2, the sequence unit 12 in step S10 receives an image sequence data IMG_SEQ. The image sequence data IMG_SEQ is an excerpt of an image sequence corresponding to the same scene. For concision purposes, in the present embodiment, the image sequence data IMG_SEQ consists of five sequential image frames: IMG_1, IMG_2, IMG_3, IMG_4, and IMG_5. The sequence unit 12 selectively adjusts the output order of the image sequence data IMG_SEQ so as to generate a transformed image sequence data, wherein the transformed image sequence data comprises a key image frame and a non-key image frame. According to an embodiment of the present invention, when the depth map generation module for a foreground object 10 is operated under a forward mode, the key image frame is the first image frame IMG_1 of the image sequence data IMG_SEQ, while the non-key image frame is the second image frame IMG_2 in the image sequence data IMG_SEQ. According to another embodiment of the present invention, when the depth map generation module for a foreground object 10 is operated under a reverse mode, the key image frame is the last image frame IMG_5 of the image sequence data IMG_SEQ, while the non-key image frame is the second-to-last image frame IMG_4 in the image sequence data IMG_SEQ.

Figure 3:
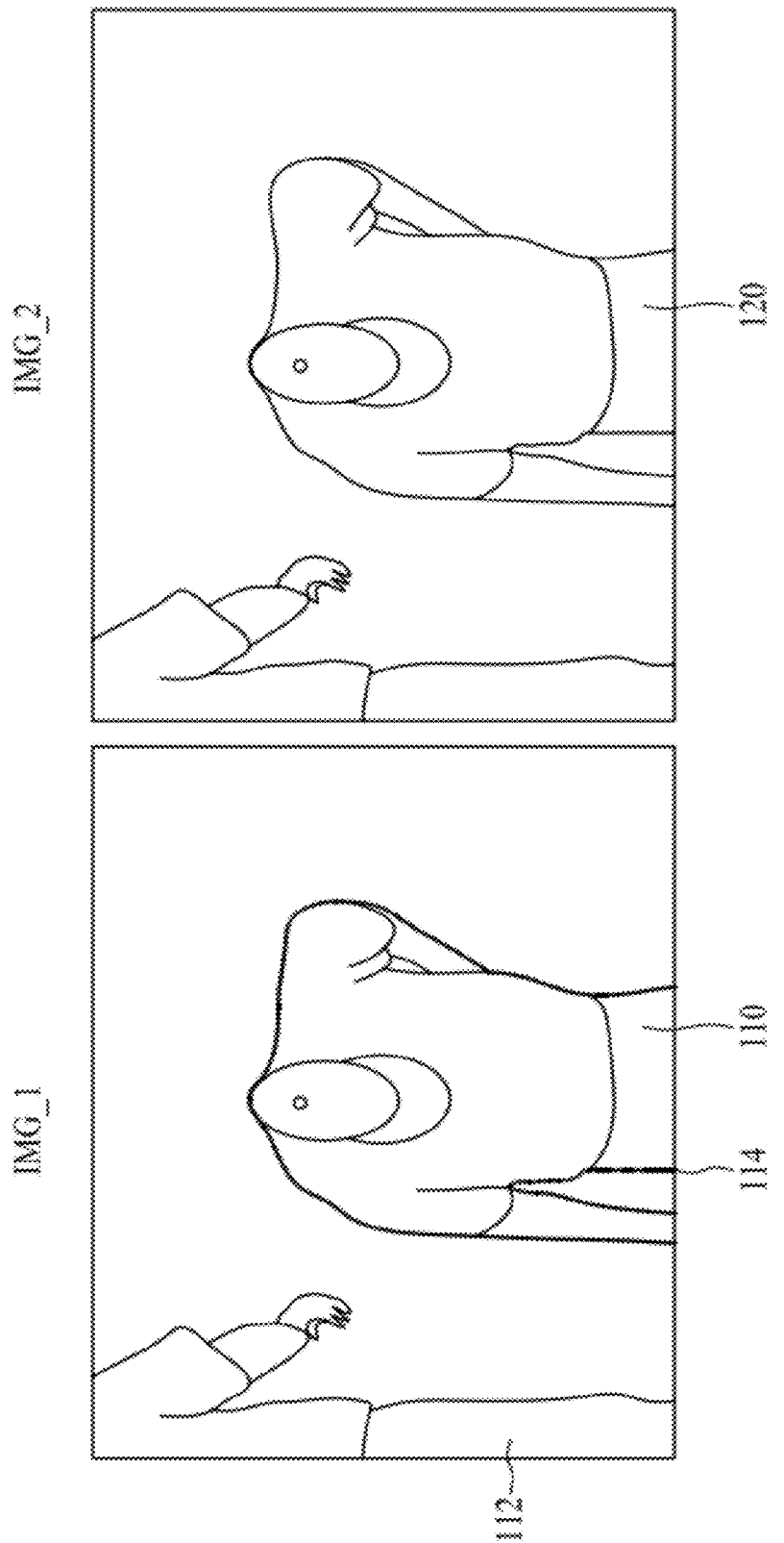
FIG. 3 illustrates a key image frame and a non-key image frame.

In one embodiment, when the depth map generation module for a foreground object 10 is operated under a forward mode, the sequence unit 12 outputs a transformed image sequence data comprising a key image frame IMG_1 to the data providing unit 14. The data providing unit 14 is configured to provide at least one depth indicative information and a contour information in the first segment 110 of the key image frame IMG_1. Referring to FIG. 3, the key image frame IMG_1 comprises a foreground object and another foreground object 112, and the first segment 110 is the foreground object of the key image frame IMG_1. The first segment 110 has at least one depth indicative information DEP_1, for example, the depth indicative information of the left arm in the first segment 110 or the depth indicative information of the right arm in the first segment 110. In order to generate a contour of a second segment 120 in the non-key image frame IMG_2 automatically, wherein the second segment 120 corresponds to the first segment 110 of the key image frame IMG_1, a user should first manually generate a contour 114 of the first segment 110 in the data providing unit 14, as shown in FIG. 3.

After generating the contour 114 of the first segment 110, the data providing unit 14 outputs the contour CON_1 of a first segment to the segment motion vector generation unit 18. The segment motion vector generation unit 18 generates a segment motion vector VEC_2, the deformed key image frame IMG_1', and the deformed contour CON_1 of the first segment according to the color information of the key image frame IMG_1, the color information of the non-key image frame IMG_2, and the contour CON_1 of the first segment in the key image frame IMG_1.

Figure 4:
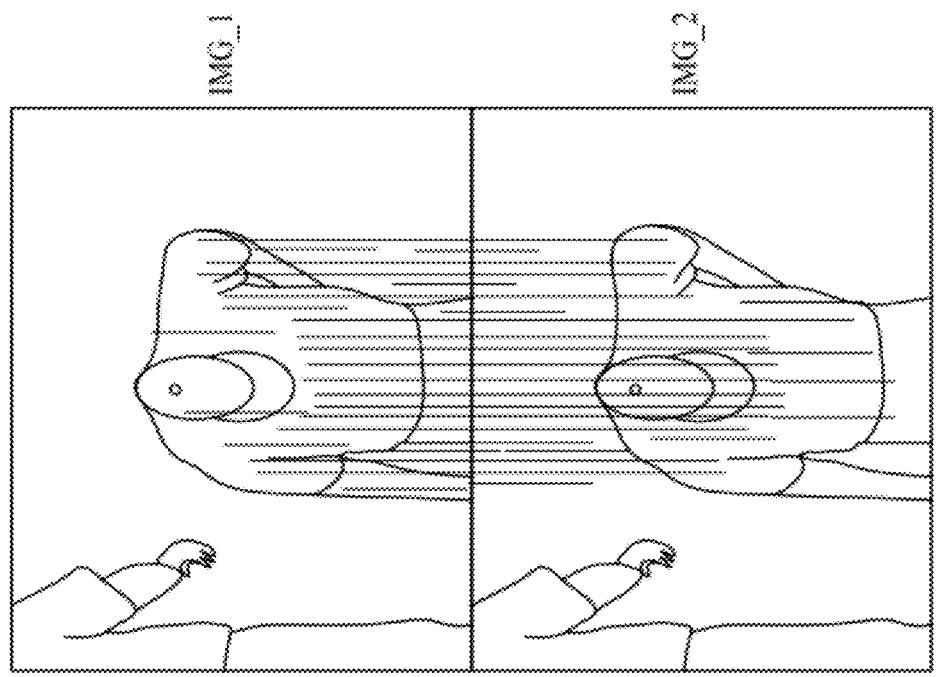
FIG. 4 shows a block diagram of the segment motion vector generation unit according to an embodiment of the present invention.
Figure 4:
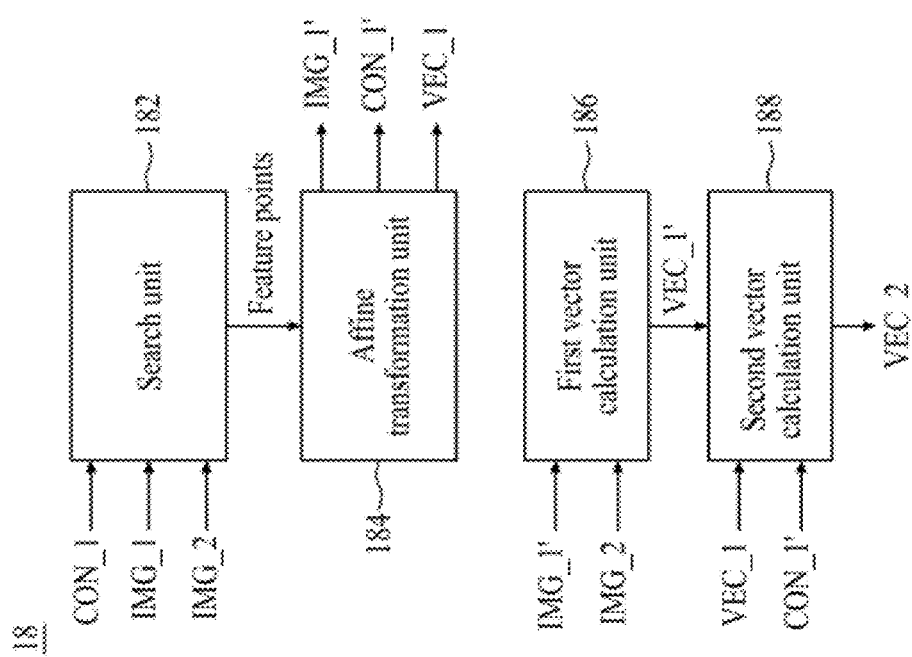

FIG. 4 shows a block diagram of the segment motion vector generation unit 18 according to an embodiment of the present invention, wherein the segment motion vector generation unit 18 comprises a search unit 182, an affine transformation unit 184, a first vector calculation unit 186, and a second vector calculation unit 188. The search unit 182 is configured to search for the coordinates of common feature points between the key image frame IMG_1 and the first non-key image frame IMG_2, particularly the coordinates of the feature points on the contour CON_1 of the first segment in the key image frame IMG_1. The affine transformation unit 184 executes an affine transformation, such as a rotation, a translation, or a zoom, on the key image frame IMG_1 and the contour 114 of the first segment 110 according to the difference between the coordinates of these feature points, so as to generate the deformed key image frame IMG_1', the deformed contour CON_1' of the first segment 110, and a motion vector VEC_1. Next, the first vector calculation unit 186 utilizes optical flow to calculate the deformed key image frame IMG_1' and the non-key image frame IMG_2 to obtain a relative motion vector VEC_1' between the deformed key image frame IMG_1' and the non-key image frame IMG_2. After the second vector calculation unit 188 receives the deformed contour CON_1' of the first segment 110 and the relative motion vector VEC_1' of the entire image frame, the motion vector VEC_1 of each pixel on the deformed contour CON_1' of the first segment and the relative motion vector VEC_1' are summed, so as to obtain a final segment motion vector VEC_2 of each pixel on the deformed contour CON_1' of the first segment 110.

Figure 5A:
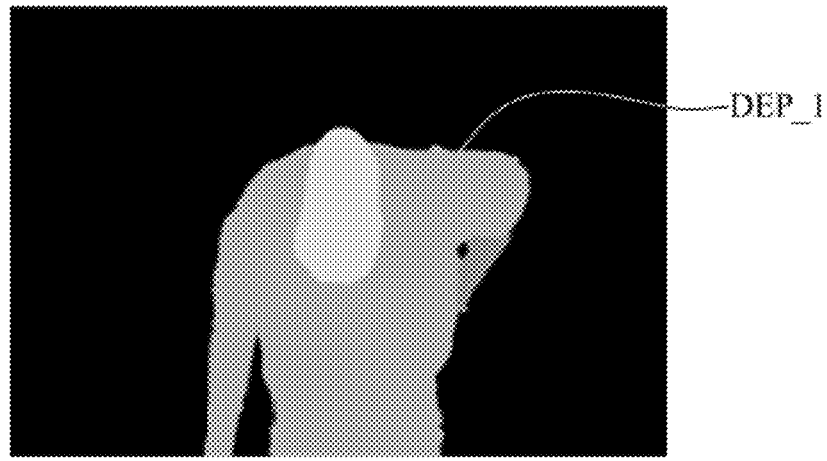
FIGS. 5A to 5C illustrate the image processing steps using the segment motion vector generation unit.
Figure 5B:
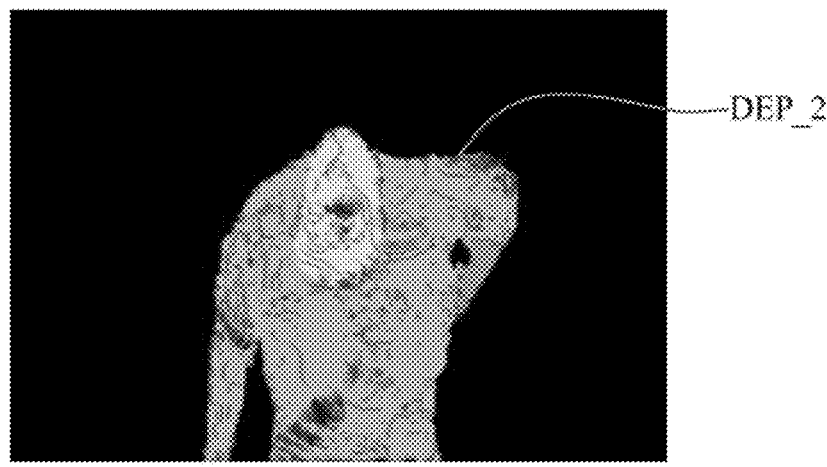
Figure 5C:
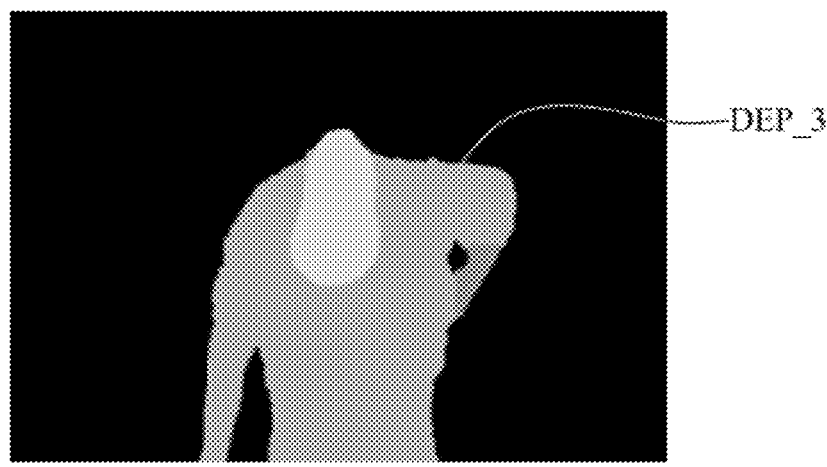

FIGS. 5A to 5C illustrate the image processing steps using the segment motion vector generation unit 18. FIG. 5A shows the depth indicative information DEP_1 of the first segment 110. After being transformed by the segment motion vector VEC_2, the depth indicative information DEP_2 of the second segment 120 is incomplete, as shown in FIG. 5B.

After obtaining a contour CON_2 of the second segment 120 and a depth indicative information DEP_2 of the second segment 120, the depth repair unit 22 repairs the depth indicative information DEP_2 of the non-key image frame IMG_2 according to a contour CON_2 of the second segment 120, the key image frame IMG_1, and color information of the first non-key image frame IMG_2, so as to generate the depth indicative information DEP_3 of the second segment 120 in the non-key image frame IMG_2, as shown in FIG. 5C.

Figure 6:
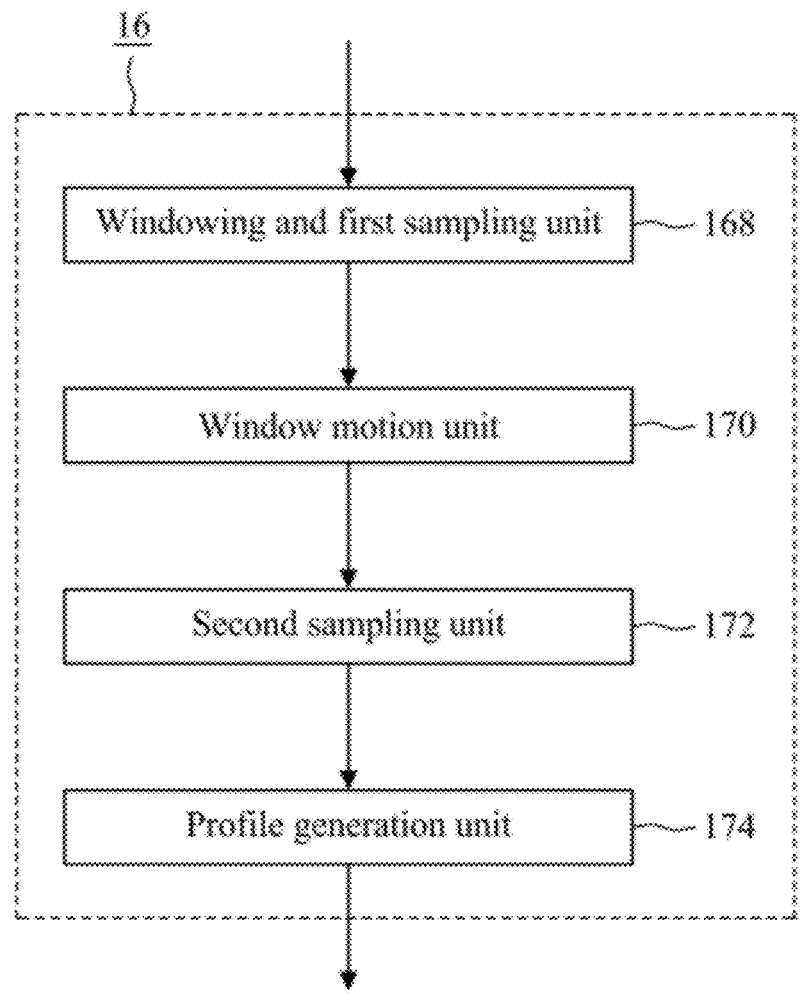
FIG. 6 shows a block diagram of the contour generation unit according to an embodiment of the present invention.

Referring back to FIG. 1, after generating the segment motion vector VEC_2, the contour generation unit 16 generates a contour information CON_2 automatically according to color information of the key image frame IMG_1, color information of the non-key image frame IMG_2, the segment motion vector VEC_2, the contour CON_1 of the first segment, color information of the deformed key image frame IMG_1', and the deformed contour CON_1' of the first segment. The block diagram of the contour generation unit 16, as shown in FIG. 6, comprises a windowing and first sampling unit 168, a window motion unit 170, a second sampling unit 172, and a profile generation unit 174.

Figure 7:
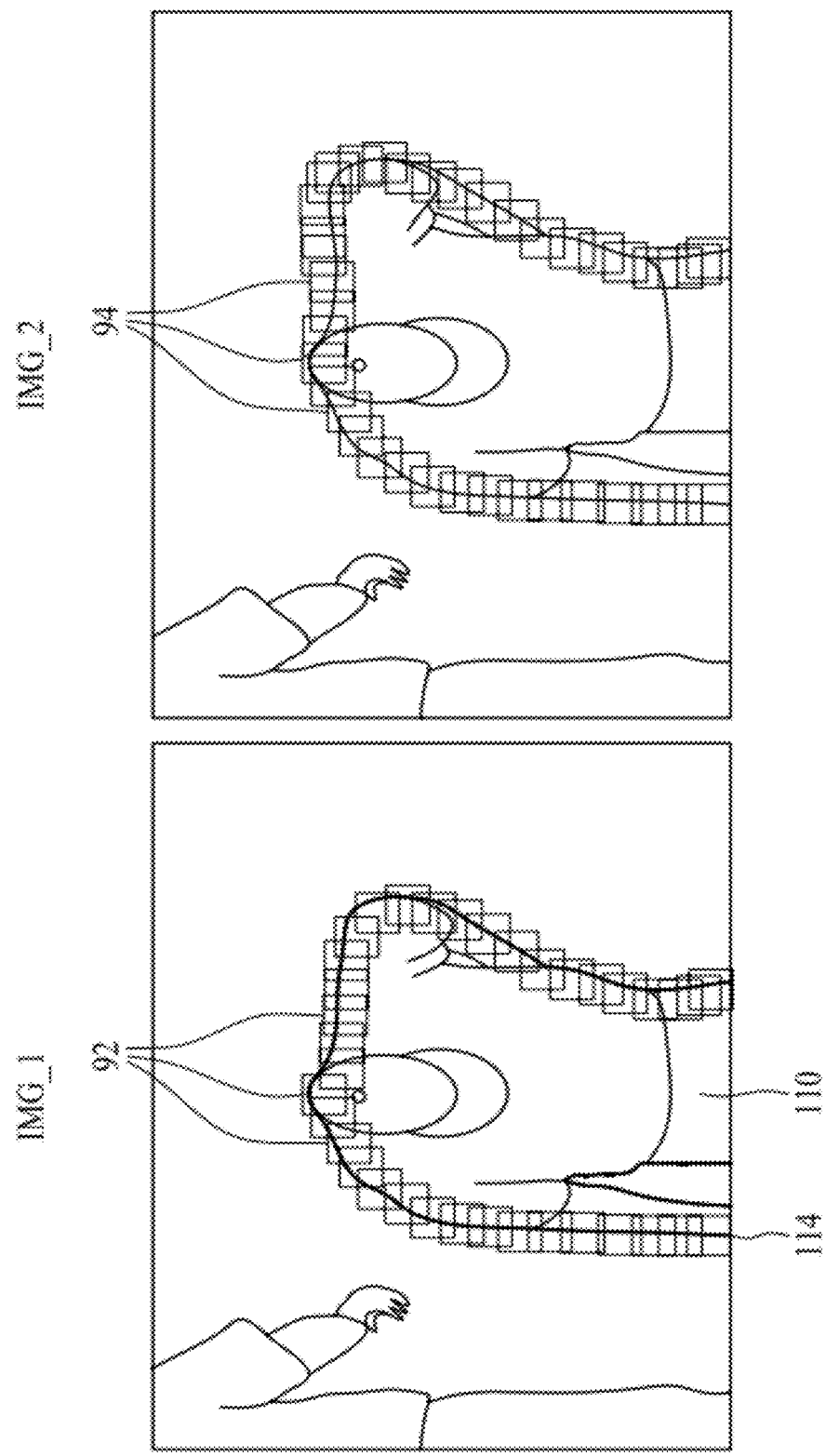
FIG. 7 illustrates an operating mode of the contour generation unit according to an embodiment of the present invention.

FIG. 7 illustrates an operating mode of the contour generation unit 16 according to an embodiment of the present invention. Referring to FIG. 7, the windowing and first sampling unit 168 establishes a plurality of windows 92 along the contour 114 of the first segment 110 in the key image frame IMG_1. The windows 92 are rectangular in shape, and can be rectangles of same or different sizes, overlapping each other. Next, the windowing and first sampling unit 168 samples a set of contour and color information in the windows 92 according to the contour 114 of the first segment 110. The sampling color information can be categorized into foreground color information or background color information according to the window 92 landing position, that is, inside or outside of the contour 114. In addition, sampling contour information can define foreground contour information in each window according to the window 92 landing position, that is, inside or outside the contour 114.

In the following step, the window motion unit 170 transfers the windows 92 to the non-key image frame IMG_2, in order to establish a plurality of windows 94 according to the information of each window's foreground segment motion vector generated by the segment motion vector generation unit 18. Then, the second sampling unit 172 samples color information of the foreground and the background in the windows 94 according to the deformed contour CON_1' of the first segment, and references the color information of the foreground and the background that were sampled by the windowing and first sampling unit 168, so as to form a set of color information of the foreground and the background. Color information sampled by the second sampling unit 172 in the windows 94 can be categorized into foreground color information and background color information. The contour information sampled by the second sampling unit 172 can be recognized as a foreground contour information according to the landing position of the windows 94, that is, inside or outside the deformed contour CON_1' of the first segment. Therefore, the profile generation unit 174 can perform a weighted computation on the contour and color information.

When performing the weighted computation, the proportion of the foreground contour or the proportion of the color in the second segment can be determined according to whether the foreground color information and the background color information are clearly distinguishable. If the foreground color and the background color can be clearly distinguished, then the proportion of the foreground contour information is decreased; if the foreground color and the background color cannot be clearly distinguished, then the proportion of the foreground contour information is increased. In addition, the motion vector information is referenced while determining the color and contour proportion in the window. In one embodiment of the present invention, when the motion vector is large, the proportion of the foreground contour information is decreased.

In the following steps, the aforementioned steps are repeated to obtain a contour of a second segment 120 in the first non-key image frame. However, the contour generation method of the second segment 120 should not be limited by the aforementioned embodiment; other image processing means could be used to generate a contour of the second segment 120.

After the generation of the segment motion vector VEC_2, the depth motion unit 20 transfers at least one depth indicative information DEP_1 of the first segment 110 in the key image frame IMG_1 to the non-key image frame IMG_2, so as to generate at least one depth indicative information DEP_2 of the non-key image frame IMG_2. The depth indicative information DEP_1 is provided by the data providing unit 14. In the aforementioned step, the generation of segment motion vector VEC_2 is not precise due to the influence of image color information. Therefore, it is possible for the depth indicative information DEP_2 of the second segment 120 to fall outside of a contour CON_2 of a second segment during the process when the depth indicative information DEP_1 of the first segment 110 is transferred to the non-key image frame IMG_2.

In addition, the depth indicative information of the segment in another non-key image frame can be generated according to a precise contour of a segment in a previous image frame, a previous image frame, and a current non-key image frame.

For example, the depth indicative information of a segment in the non-key image frame IMG_3 can be generated according to the color information of the previous image frame IMG_2, the precise contour of the second segment 120 in the non-key image frame IMG_2, and the color information of the current non-key image frame IMG_3.

Figure 8:
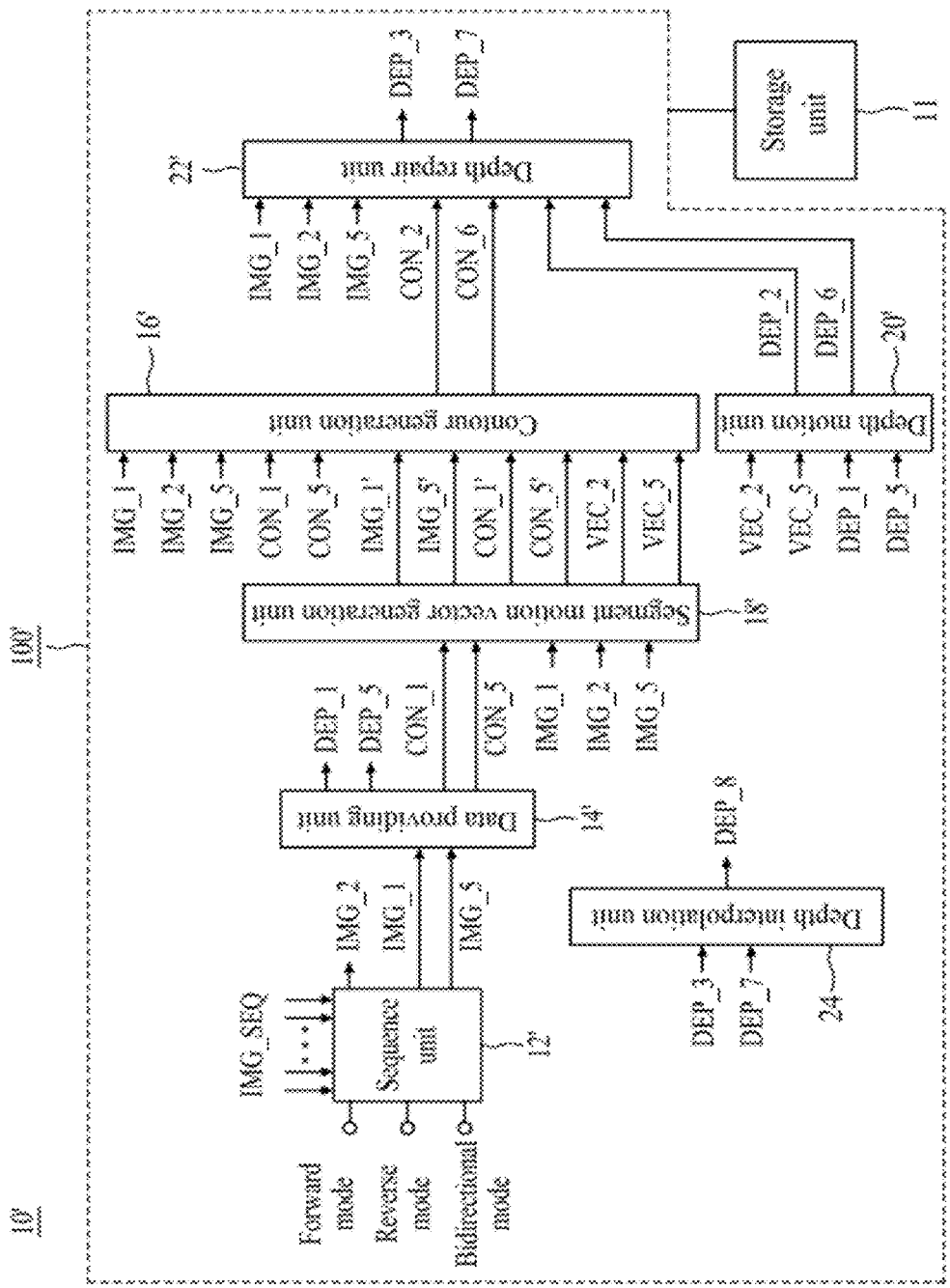
FIG. 8 shows a block diagram of the depth map generation module for a foreground object operated under bidirectional mode.

According to another embodiment of the present invention, in addition to a forward mode and a reverse mode, the depth map generation module for a foreground object 10 can also be operated under a bidirectional mode. FIG. 8 shows a block diagram of the microprocessor 100' of the depth map generation module for a foreground object 10' operated under a bidirectional mode. Under this mode, the sequence unit 12' outputs a transformed image sequence data, which comprises a key image frame IMG_1 and another key image frame IMG_5, to the data providing unit 14'. Therefore, the data providing unit 14' generates the first depth indicative information DEP_1 of the first segment in the key image frame IMG_1, the contour CON_1 of the first segment in the key image frame, the at least one second depth indicative information DEP_5 of a segment in another key image frame IMG_5, and the contour CON_5 of the segment in another key image frame IMG_5, wherein the segment in another key image frame IMG_5 corresponds to the foreground object 112 in the key image frame IMG_1. After receiving the color information of the key image frame IMG_1, the color information of the first non-key image frame IMG_2, the first depth indicative information DEP_2 of the first segment, and the contour CON_2 of the first segment, the depth repair unit 22' generates depth indicative information DEP_3 of the second segment 120 in the non-key image frame IMG_2. After receiving the color information of another key image frame IMG_5, the color information of the first non-key image frame IMG_2, the second depth indicative information DEP_6 of the segment, and a contour information CON_6 of a segment in another key image frame IMG_5, the depth repair unit 22' generates depth indicative information DEP_7 of the second segment 120 in the non-key image frame IMG_2.

Referring to FIG. 8, the depth map generation module for a foreground object 10' further comprises a depth interpolation unit 24. The depth interpolation unit 24 generates at least one third depth indicative information DEP_8 according to equation (1):

$$DEP\_8 = \alpha \times DEP\_3 + (1-\alpha) \times DEP\_7, \quad (1)$$

wherein $\alpha = (M-N)/M$. In the present embodiment, M=5, N=1.

Therefore, under bidirectional mode, the non-key image frame IMG_2 generates a new depth indicative information DEP_8 according to the information of the first depth indicative information DEP_1 of the key image frame IMG_1 and the depth indicative information DEP_5 of another key image frame IMG_5. Using similar steps, the depth indicative information of other non-key image frames IMG_3 and IMG_4 can be obtained.

Figure 9:
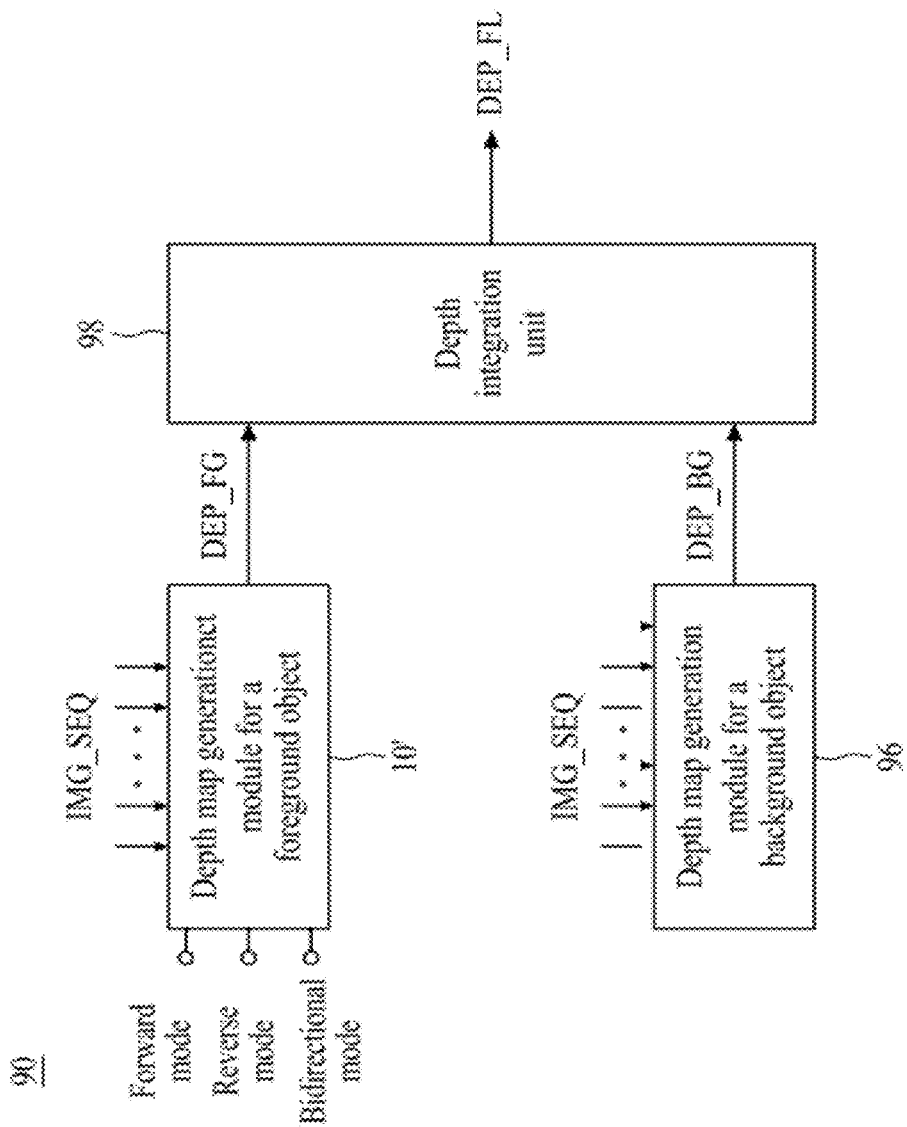
FIG. 9 shows a block diagram of the depth map generation module according to an embodiment of the present invention.

As mentioned above, the depth map generation module for a foreground object 10 can generate depth indicative information of a foreground object in a non-key image frame. The depth map of a non-key image frame can be obtained after obtaining foreground depth indicative information, if the foreground depth indicative information is integrated with background depth indicative information. FIG. 9 shows a block diagram of the depth map generation module according to an embodiment of the present invention. Referring to FIG. 9, the depth map generation module 90 comprises a depth map generation module for a foreground object 10' or a depth map generation module for a foreground object 10 (not shown), a depth map generation module for a background object 96, and a depth integration unit 98. The depth map generation module for a foreground object 10' or a depth map generation module 10 for a foreground object (not shown) generates background indicative information DEP_BG after receiving the image sequence data IMG_SEQ. After integrating the foreground depth indicative information DEP_FG and background depth indicative information DEP_BG, the depth integration unit 98 generates a depth map DEP_FL of the image sequence data IMG_SEQ.

Figure 10:
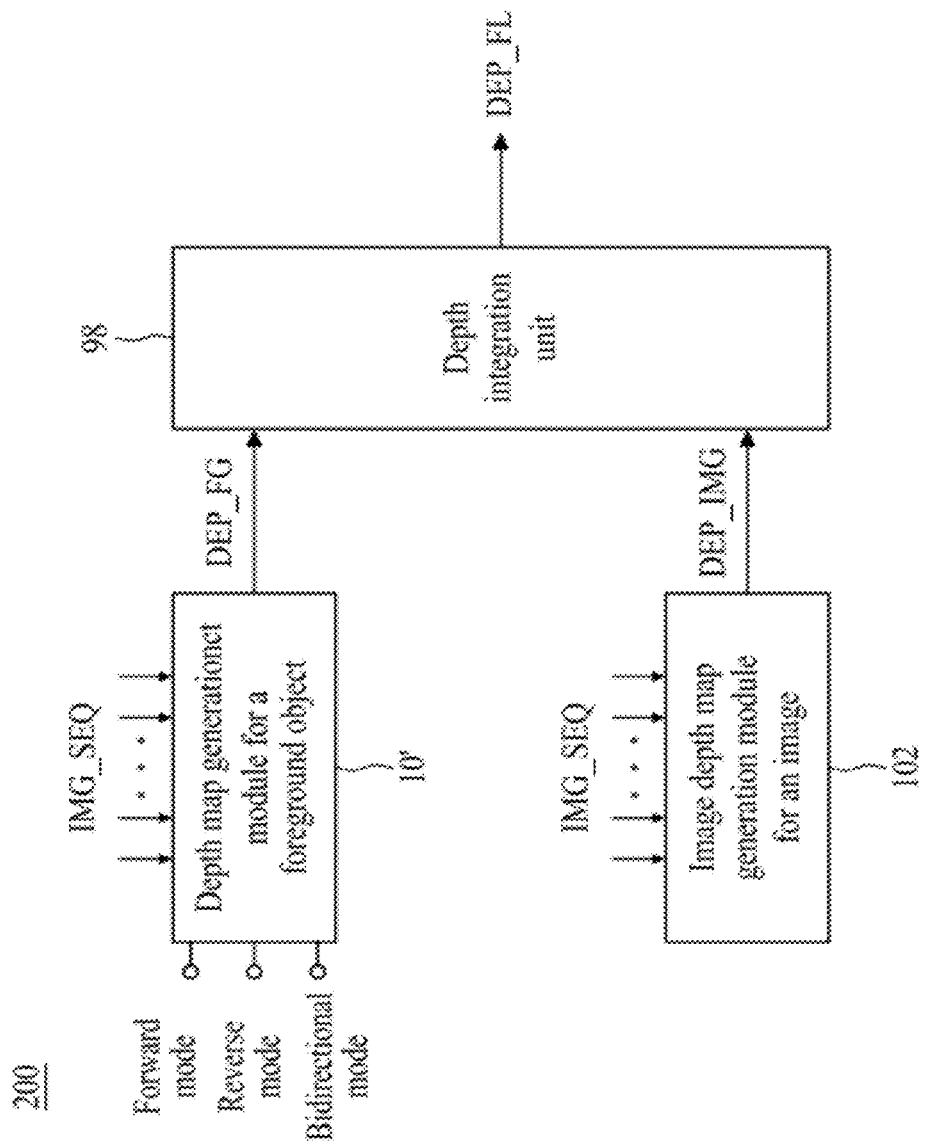
FIG. 10 shows a block diagram of the depth map generation module according to an embodiment of the present invention.

In order to enhance the depth indicative information of a foreground object, the depth map generation module for a foreground object 10' or a depth map generation module 10 for a foreground object (not shown) can also generate a depth map of image sequence data in accordance with an image depth generation unit. FIG. 10 shows a block diagram of the depth map generation module 200 according to an embodiment of the present invention. Referring to FIG. 10, the depth map generation module 200 comprises a depth map generation module for a foreground object 10' or a depth map generation module 10 for a foreground object (not shown), an image depth map generation module 102, and a depth integration unit 98. The depth map generation module for a foreground object 10' or a depth map generation module 10 for a foreground object (not shown) will generate foreground depth indicative information DEP_FG after receiving the image sequence data IMG_SEQ. After receiving the image sequence information IMG_SEQ, the image depth map generation module 102 will generate the depth indicative information DEP_IMG of the image sequence data IMG_SEQ. The depth integration unit 98 can generate the depth map DEP_FL of the image sequence data IMG_SEQ after integrating the foreground depth indicative information DEP_FG and a depth indicative information DEP_IMG.

An embodiment of the image depth map generation module 102 is described in an image depth information generation method described in a prior patent application, titled "Method for generation depth maps from monocular images and systems using the same" (PCT/CN2009/075007, application date 2009 Nov. 18). The disclosure is summarized as follows: the image depth map generation module 102 primarily selects an initial depth background. There are a variety of methods for the initial depth background generation, and the methods can be adjusted based on different input content.

A bilateral filter is utilized in the following step to characterize depth details of selected objects. It should be noted that in order to characterize the details of the selected objects received from image input into the initial depth background, a very large mask range is required. Normally, the mask range should cover 1/36 to 1/4 of the image size, otherwise a blurred contour can be obtained. In the following step, depth clues of a motion parallax are added to obtain a more precise depth map. The adding step comprises the following three sub steps:

Sub step (1): searching for motion vectors by using optical flow. Optical flow is a method for calculating each pixel's motion vector within two consecutive frames. A large amount of noise exists if optical flow is the only method utilized in obtaining motion vector, so combining sub step (1) with sub steps (2) and (3) can effectively remove the noise and achieve stable effect.

Sub step (2): generating motion vector by utilizing image segment technique. The employment of image segment technique enables recognition of image segments belonging to the same object by referencing the relationship between two consecutive frames.

Sub step (3): correcting the depth background by using motion vector.

It should be noted that the generation method of the entire depth image information adopted by the image depth map generation module 102 should not be limited to the above-mentioned embodiment. Other image processing methods which can generate background depth information or the depth information of the entire image are covered by the scope of the present invention.

After integrating the output of the depth map generation module for a foreground object 10 or the output of the depth map generation module for a foreground object 10' (not shown) according to the output of the image depth map generation module 102 and the output of the background object depth map generation module 96, the depth integration unit 98 can generate the depth map DEP_FL of the image sequence data IMG_SEQ.

Depth image based rendering (DIBR) technique can be described as a primitive 2D image combined with a corresponding depth map to generate images of different perspectives through multi-view image synthesis technique and display formats of different 3D displays. The interlaced image eventually creates a 3D effect on the display. Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to comprise within their scope such processes, machines, manufacture, compositions of matter, means, methods, or steps.

What is claimed is:

1. A depth map generation module for a foreground object configured to receive an image sequence data corresponding to a same scene, so as to generate a depth indicative information of a plurality of image frames in the image sequence data, wherein the depth map generation module for a foreground object comprises:
  a microprocessor, comprising:
  a sequence unit configured to receive the image sequence data and to selectively adjust the order of the image sequence data according to the operation mode of the depth map generation module for a foreground object, so as to generate a transformed image sequence data, wherein the transformed image sequence data comprises at least one key image frame and a first non-key image frame;
  a data providing unit configured to provide at least one first depth indicative information and a contour of a first segment in the at least one key image frame;
  a segment motion vector generation unit configured to generate a segment motion vector, a deformed key image frame, and a deformed contour of the first segment according to a color information of the key image frame, a color information of the first non-key image frame and a contour of a first segment in the key image frame;
  a contour generation unit configured to generate a contour of a second segment in the first non-key image frame according to the segment motion vector, the contour of the first segment, a color information of the deformed key image frame, the contour of the deformed first segment, a color information of the key image frame, and a color information of the first non-key image frame, wherein the first and the second segments correspond to a same object of the key image frame; and a depth motion unit configured to transfer the at least one first depth indicative information in the at least one key image frame to the first non-key image frame, so as to generate at least one second depth indicative information in the first non-key image frame; and a storage unit coupled with the microprocessor, configured to store the data processed by the microprocessor.

2. The depth map generation module for a foreground object of claim 1, wherein the microprocessor further comprises a depth repair unit configured to compensate the second depth indicative information of the first non-key image frame according to the contour of the second segment, the color information of the key image frame, and the color information of the first non-key image frame, so as to generate at least one third depth indicative information of the second segment in the first non-key image frame.

3. The depth map generation module for a foreground object of claim 1, wherein when the depth map generation module for a foreground object is operated under a forward mode, the key image frame is a first image frame of the image sequence data, and the first non-key image frame is a second image frame of the image sequence data.

4. The depth map generation module for a foreground object of claim 1, wherein when the depth map generation module for a foreground object is operated under a reverse mode, the key image frame is a last image frame of the image sequence data, and the first non-key image frame is a second-to-last image frame of the image sequence data.

5. The depth map generation module for a foreground object of claim 1, wherein the contour generation unit comprises:
  a windowing and first sampling unit configured to establish a plurality of first windows along the contour of the first segment in the key image frame, and to sample the contour and the color information in the first windows;
  a window motion unit configured to transfer the first windows to the first non-key image frame according to the information of the segment motion vector of the first segment in the key image frame of the first windows, so as to establish a plurality of second windows;
  a second sampling unit configured to form a set of foreground contour information according to the contour information sampled by the second windows on the contour of the deformed first segment, and to form a set of foreground and background color information according to the foreground and background color information sampled by the second windows on the contour of the deformed first segment and referencing the foreground and background color information sampled by the first windows; and
  a profile generation unit configured to perform a weighted computation on the sampled contour and color information in the second windows, so as to generate the contour of the second segment.

6. The depth map generation module for a foreground object of claim 5, wherein when performing the weighted computation, the profile generation unit determines a proportion of a foreground contour in the second segment according to the foreground and background color information.

7. The depth map generation module for a foreground object of claim 5, wherein when performing the weighted computation, the profile generation unit determines a proportion of the foreground contour or the color in the second segment according to the information of the segment motion vector.

8. The depth map generation module for a foreground object of claim 1, wherein the segment motion vector generation unit comprises:
  a search unit configured to search coordinates of common feature points of the contour of the first segment in the key image frame and the first non-key image frame;
  an affine transformation unit configured to execute an affine transformation according to the difference of the coordinates of the common feature points, so as to generate the deformed key image frame, the contour of the deformed first segment, and a motion vector;
  a first vector calculation unit configured to calculate the deformed key image frame and the non-key image frame, so as to obtain a relative motion vector regarding the deformed key image frame and the non-key image frame; and
  a second vector calculation unit configured to receive the contour of the deformed first segment and the relative motion vector, and to add up the motion vector and the relative motion vector of each pixel in the contour of the deformed first segment, so as to generate the segment motion vector of each pixel in the contour of the deformed first segment;
  wherein the segment motion vector defines the transfer between the first segment and the second segment.

9. The depth map generation module for a foreground object of claim 1, wherein the at least one depth indicative information of a third segment in a second non-key image frame close to the first non-key image frame is generated according to the contour of the second segment, the first non-key image frame, and the second non-key image frame, and the second and third segments correspond to a same object in the key image frame.

10. The depth map generation module for a foreground object of claim 1, wherein when the depth map generation module for a foreground object is operated under a bidirectional mode, the transformed image sequence data comprises a first key image frame and a second key image frame, wherein the first key image frame is the first image frame in the image sequence data, the second key image frame is the last image frame in the image sequence data, and the first non-key image frame is the second image frame in the image sequence data.

11. The depth map generation module for a foreground object of claim 10, further comprising a depth interpolation unit, wherein when the depth map generation module for a foreground object is operated under the bidirectional mode, the data providing unit provides the at least one depth indicative information of the first segment in the first key image frame and the at least one depth indicative information of a fourth segment in the second key image frame, the fourth and the first segment correspond to a first object in the key image frame, and the depth interpolation unit uses linear interpolation to generate at least one fourth depth indicative information according to the information calculated by the depth indicative information of the first segment and the information calculated by the depth indicative information of the fourth segment.

12. A method for generating a depth map for a foreground object in an image sequence data corresponding to a same scene, comprising:
  receiving the image sequence data, wherein the image sequence data comprises a plurality of image frames, and each image frame comprises at least one object;
  selecting at least one key image frame and a first non-key image frame from the image sequence data according to an operation mode of a depth map generation module for a foreground object, so as to generate a transformed image sequence data;
  providing at least one first depth indicative information and a contour of a first segment in the at least one key image frame; and
  executing the following steps via a microprocessor:
    generating a segment motion vector, a deformed key image frame, and a contour of the deformed first segment according to a color information of the key image frame, a color information of the first non-key image frame, and a contour of the first segment in the key image frame;
    generating a contour of a second segment in the first non-key image frame, wherein the first and second segments correspond to a same object in the key image frame, according to the segment motion vector, the contour of the first segment, the color information of the deformed key image frame, the contour of the deformed first segment, the color information of the key image frame, and the color information of the first non-key image frame; and
    transferring at least one first depth indicative information of the at least one key image frame to the first non-key image frame according to the segment motion vector, so as to generate at least one second depth indicative information of the first non-key image frame.

13. The method of claim 12, wherein the microprocessor executing process further comprises a step of:
  compensating the second depth indicative information in the first non-key image frame according to the contour of the second segment, the color information of the key image frame, and the color information of the first non-key image frame, so as to generate at least one third depth indicative information of the second segment in the first non-key image frame.

14. The method of claim 12, wherein when the depth map generation module for a foreground object is operated under a forward mode, the key image frame is the first image frame of the image sequence data, and the first non-key image frame is the second image frame of the image sequence data.

15. The method of claim 12, wherein when the depth map generation module for a foreground object is operated under a reverse mode, the key image frame is the last image frame of the image sequence data, and the first non-key image frame is a second-to-last image frame of the image sequence data.

16. The method of claim 12, wherein the step of generating a segment motion vector further comprises:
  locating coordinates of the common feature points inside the contour of the first segment in the key image frame and the first non-key image frame;
  executing an affine transformation according to differences between the coordinates of the common feature points inside the contour of the first segment in the key image frame and the first non-key image frame, so as to generate the deformed key image frame, the contour of the deformed first segment, and a motion vector;

calculating the deformed key image frame and the non-key image frame to obtain a relative motion vector regarding the deformed key image frame and the non-key image frame; and receiving the relative motion vector and the contour of the deformed first segment, and adding up the motion vector and the relative motion vector of each pixel in the contour of the deformed first segment, so as to generate a segment motion vector of each pixel inside the contour of the deformed first segment;

wherein the segment motion vector defines the translation between the first segment and the second segment.

17. The method of claim 12, wherein the step of generating the contour of the second segment in the first non-key image frame comprises:

establishing a plurality of first windows along the contour of the first segment in the key image frame;

sampling the contour and the color information in the first windows;

transferring the first windows to the first non-key image frame according to the information of the segment motion vector of the first segment in the key image frame, so as to establish a plurality of second windows;

forming a set of foreground contour and color information and background color information according to the contour and color information sampled by the second windows on the contour of the deformed first segment, and referencing the foreground and background color information sampled by the first windows; and performing a weighted computation on the contour and color information sampled by the second windows, so as to generate the contour of the second segment.

18. The method of claim 17, wherein the performing step further comprises:

determining a proportion of the foreground contour or color in the second segment according to the foreground and background color information.

19. The method of claim 17, wherein the performing step further comprises:

determining a proportion of the foreground contour or color in the second segment according to the information of the segment motion vector.

20. The method of claim 12, wherein the at least one depth indicative information of a third segment in a second non-key image frame close to the first non-key image frame is generated according to the contour of the second segment, the first non-key image frame, and the second non-key image frame, and the second and third segments correspond to a same object in the key image frame.

21. The method of claim 12, wherein when the depth map generation module for a foreground object is operated under a bidirectional mode, the transformed image sequence data further comprises another key image frame, the key image frame is the first image frame in the image sequence data, the another key image frame is the last image frame in the image sequence data, and the first non-key image frame is the second image frame in the image sequence data.

22. The method of claim 21, wherein the microprocessor executing process further comprises the steps of:

providing the at least one depth indicative information of the first segment in the key image frame;

providing the at least one depth indicative information of a fourth segment in the another key image frame, wherein the fourth segment and the first segment correspond to a same object in the key image frame; and generating at least one fourth depth indicative information according to the information calculated by the depth indicative information of the first segment and the information calculated by the depth indicative information of the fourth segment by linear interpolation.

23. The method of claim 12, wherein the microprocessor executing process further comprises the steps of:

receiving the image sequence data, so as to generate the depth indicative information of a background object; and integrating the at least one second depth indicative information and the depth indicative information of the background object, so as to generate the depth map of the image sequence data.

24. The method of claim 12, wherein the microprocessor executing process further comprises a step of:

receiving the image sequence data, so as to generate the depth indicative information of the image sequence data; and integrating the at least one second depth indicative information and the depth indicative information of the image sequence data, so as to generate the depth map of the image sequence data.

* * * * *